(12) United States Patent
Nakazato et al.

(10) Patent No.: US 8,905,634 B2
(45) Date of Patent: Dec. 9, 2014

(54) TEMPERATURE DETECTION APPARATUS

(71) Applicants: Yukihira Nakazato, Kanagawa (JP);
Junichi Matsuoka, Kanagawa (JP)

(72) Inventors: Yukihira Nakazato, Kanagawa (JP);
Junichi Matsuoka, Kanagawa (JP)

(73) Assignee: Netcomsec Co. Ltd, Tokyo (JP)

( * ) Notice: Subject to any disclaimer, the term of this patent is extended or adjusted under 35 U.S.C. 154(b) by 20 days.

(21) Appl. No.: 13/904,598

(22) Filed: May 29, 2013

(65) Prior Publication Data

US 2013/0259089 A1    Oct. 3, 2013

Related U.S. Application Data

(62) Division of application No. 12/573,555, filed on Oct. 5, 2009, now Pat. No. 8,491,187.

(30) Foreign Application Priority Data

Oct. 9, 2008   (JP) ................. 2008-262827

(51) Int. Cl.
*G01K 1/00* (2006.01)
*G01K 13/00* (2006.01)
*G01K 1/12* (2006.01)
*G01K 1/14* (2006.01)
*G01K 1/08* (2006.01)

(52) U.S. Cl.
CPC .. *G01K 1/12* (2013.01); *G01K 1/14* (2013.01); *G01K 1/08* (2013.01)

USPC ........... 374/152; 374/183; 374/141; 374/185; 361/37

(58) Field of Classification Search
USPC .................. 374/152, 183, 141, 185; 361/37
See application file for complete search history.

(56) References Cited

U.S. PATENT DOCUMENTS

| 3,930,185 | A | * | 12/1975 | Barkow et al. | ........... 315/368.26 |
| 3,931,620 | A | * | 1/1976 | Wellman et al. | ............... 340/599 |
| 4,140,999 | A | * | 2/1979 | Conway | .................... 340/870.11 |
| 2002/0180140 | A1 | * | 12/2002 | Honda | ........................ 271/10.11 |
| 2008/0231197 | A1 | * | 9/2008 | Chiba et al. | .................... 315/106 |

* cited by examiner

*Primary Examiner* — Mirellys Jagan
(74) *Attorney, Agent, or Firm* — Sughrue Mion, PLLC

(57) ABSTRACT

A temperature detection apparatus includes a transformer, a thermostat attached directly to an electrically conductive site of the heating element and has contacts that become short-circuited or come into an open-circuit condition depending on whether or not the temperature of the heating element is equal to or higher than a predetermined value, the contacts being connected to a secondary coil in the transformer, a DC voltage source and a transistor configured to supply required AC power to a primary coil in the transformer, a current detection resistor configured to detect a current flowing through the primary coil in the transformer, and a comparison circuit detecting a voltage generated across the current detection resistor when a current flows through the current detection resistor, the comparison circuit outputting an alarm signal when the current flowing through the primary coil in the transformer exceeds a preset threshold current.

4 Claims, 3 Drawing Sheets

TEMPERATURE DETECTION APPARATUS

This application is a divisional application of Ser. No. 12/573,555 filed on Oct. 5, 2009, and claims the benefit of priority from prior Japanese patent application No. 2008-262827, filed on Oct. 9, 2008, the disclosure of which is incorporated herein in its entirety by reference.

TECHNICAL FIELD

The present invention relates to a temperature detection apparatus preferably used to detect the temperature of an apparatus operating at a high voltage.

BACKGROUND ART

In a power amplifier, an electron tube, or the like, which consumes high power, the temperature of the apparatus needs to be monitored. Moreover, if the apparatus temperature rises to a predetermined value, the power amplifier, an electron tube, or the like need to be cooled using a fan or the like or the operation thereof needs to be stopped. Thus, these electronic apparatuses need to be prevented from being damaged.

Conventional methods for detecting the temperature of the electronic apparatus involve a thermostat and a thermistor. In the above-described power amplifier and electron tube, a thermostat or a thermistor is attached to an electrode of an amplifying transistor, an electrode of the electron tube, or the like which serve as a heating element, for thermal coupling.

However, the amplifying transistor, electron tube, or the like often operate at a high voltage. Thus, when the thermostat or the thermistor is attached directly to such a component, if the attachment site includes an electrical conductor, high voltage is applied to the thermostat or the thermistor.

In general, a detecting circuit uses a thermostat or a thermistor to output a temperature detection signal, an alarm signal, and the like. The detecting circuit operates at a relatively low voltage in order to supply output signals to a logical circuit and the like.

Thus, to allow the temperature of a heating element operating at a high voltage to be measured, the heating element needs to be insulated from the thermostat or the thermistor, to which the high voltage is applied, needs to be insulated from the detecting circuit, which uses the thermostat or the thermistor to output a temperature detection signal, an alarm signal, and the like.

The temperature detection apparatus in the background art adopts the technique of, for example, as shown in FIG. 1, attaching thermostat 202 to heating element 200 via insulator 201 to insulate heating element 200 from thermostat 202. FIG. 1 shows an example in which thermostat 202 is used to detect the temperature. However, the above-described technique also applies to the use of a thermistor.

Japanese Patent Laid-Open No. 7-49720 describes a configuration in which a detecting circuit (referred to as a "temperature sensing circuit" in Japanese Patent Laid-Open No. 7-49720) is operated by being supplied with the same high voltage as that applied to a heating element, thus eliminating the need to insulate a thermostat from the detecting circuit.

In the above-described background art, the configuration shown in FIG. 1 and in which the insulator is interposed between the heating element and the thermostat, the thermostat detects the temperature of the heating element via the thermal resistance of the insulator. Thus, accurately measuring the temperature of the heating element is difficult. Furthermore, sensing of the temperature may disadvantageously be delayed (time lag).

On the other hand, in the configuration described in Japanese Patent Laid-Open No. 7-49720, the detecting circuit is operated by being supplied with the same high voltage as that applied to the heating element. Thus, output signals from the detecting circuit cannot directly be supplied to a logical circuit or the like which operates at a relatively low voltage (hereinafter referred to as a low-voltage operating circuit). Consequently, the detecting circuit needs to be insulated from the low-voltage operating circuit that receives output signals from the detecting circuit or it also needs to carry out required processing (control of a fan and control such as the stop of the operation of the circuit including the heating element) using signals detected by the thermostat. As a result, the configuration of the detecting circuit is disadvantageously complicated.

SUMMARY

Thus, an object of the present invention is to provide a temperature detection apparatus that enables a thermostat or a thermistor to be attached directly to a heating element, the apparatus being simply configured to allow the temperature of the heating element to be detected.

To accomplish this object, the present invention provides a temperature detection apparatus configured to detect the temperature of a heating element to which a high voltage is applied, the apparatus comprising:

a transformer;

a thermostat attached directly to an electrically conductive site of the heating element and having contacts that become short-circuited or come into an open-circuit condition depending on whether or not the temperature of the heating element is equal to or higher than a predetermined value, the contacts being connected to a secondary coil in the transformer;

a DC voltage source and a transistor configured to supply required AC power to a primary coil in the transformer;

a current detection resistor configured to detect a current flowing through the primary coil in the transformer; and a comparison circuit detecting a voltage generated across the current detection resistor when a current flows through the current detection resistor, the comparison circuit outputting an alarm signal when the current flowing through the primary coil in the transformer exceeds a preset threshold current.

The present invention also provides a temperature detection apparatus configured to detect temperature of a heating element to which a high voltage is applied, the apparatus comprising:

a transformer;

a thermistor attached directly to an electrically conductive site of the heating element and having a resistance value varying depending on the temperature of the heating element, the thermistor being connected between secondary coils in the transformer;

a DC voltage source and a transistor configured to supply required AC power to a primary coil in the transformer;

a current detection resistor configured to detect a current flowing through the primary coil in the transformer; and a current detection circuit detecting a voltage generated across the current detection resistor when current flows through the current detection resistor, and outputting a voltage proportional to the voltage.

The above and other objects, features, and advantages of the present invention will become apparent from the following description with reference to the accompanying drawings, which illustrate examples of the present invention.

EXEMPLARY EMBODIMENT

The present invention will be described with reference to the drawings.

First Exemplary Embodiment

Figure 1:
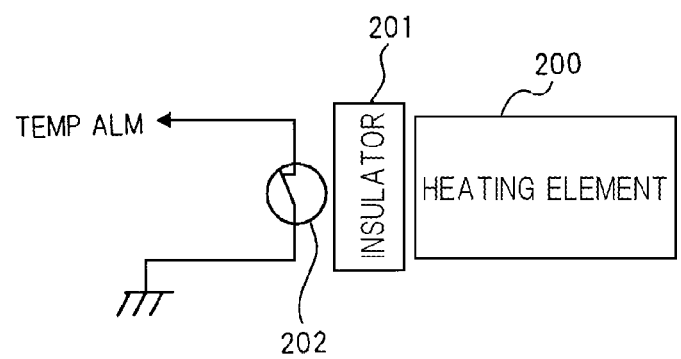
FIG. 1 is a block diagram showing an example of the configuration of a temperature detection apparatus in the background art.
Figure 2:
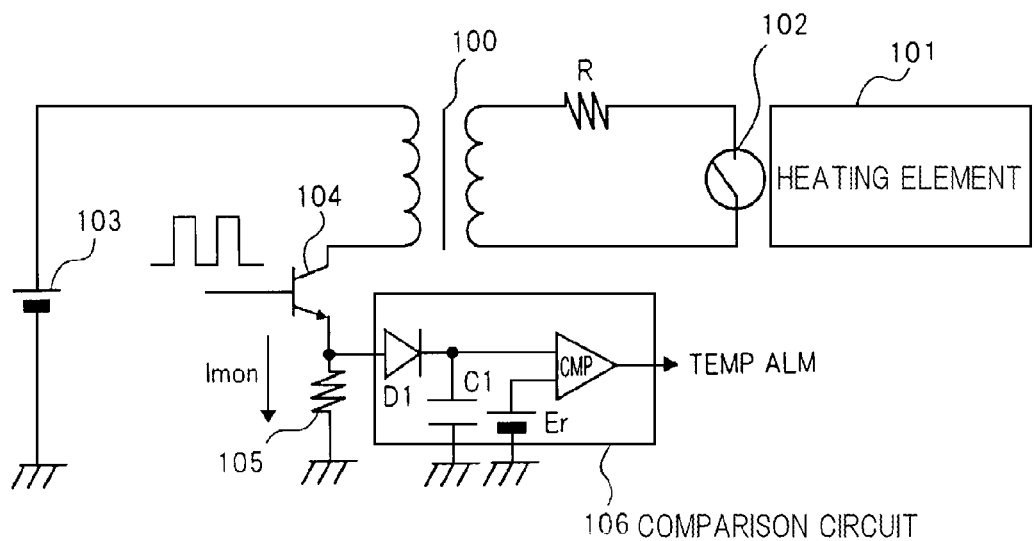
FIG. 2 is a circuit diagram showing an example of the configuration of a temperature detection apparatus according to a first exemplary embodiment.

FIG. 2 is a circuit diagram showing an example of the configuration of a temperature detection apparatus according to a first exemplary embodiment.

As shown in FIG. 2, the temperature detection apparatus according to the first exemplary embodiment has transformer 100, thermostat 102 having contacts that become short-circuited or come into an open-circuit condition depending on whether or not the temperature of heating element 100 is equal to or higher than a predetermined value, whose contacts are connected to a secondary coil in transformer 100, DC voltage source 103 and transistor 104 configured to apply a required AC voltage to primary coil in transformer 100, current detection resistor 105 configured to detect a current flowing through the primary coil in transformer 100, and comparison circuit 106 that outputs an alarm signal when the current flows through the primary coil in transformer 100 exceeds a preset threshold current.

A pulse signal having a constant frequency generated by an oscillation source (not shown in the drawings) is supplied to transistor 104. Transistor 104 is turned on and off in response to the pulse signal to supply AC power to the primary coil in transformer 100.

Thermostat 102 is attached directly to an electrically conductive site of heating element 101. For example, when heating element 101 has a temperature lower than a predetermined value, the contacts enter into an open-circuit condition. When heating element 101 has a temperature equal to or higher than the predetermined value, the contacts become short-circuited.

Current detection resistor 105 is interposed between an emitter of transistor 104 and a ground potential to generate, between the two terminals, a voltage proportional to the current (Imon) flowing through the primary coil in transformer 100.

Comparison circuit 106 includes, for example, rectifying diode D1, capacitor C1, reference voltage source Er, and comparator CMP. Rectifying diode D1 and capacitor C1 rectify an AC voltage generated between the terminals of current detection resistor 105. Comparator CMP outputs the result of comparison (TEMP MON) of a DC voltage resulting from the rectification with reference voltage Vref output by reference voltage source Er. Reference voltage Vref corresponds to a threshold current required to output the above-described alarm signal. Reference voltage Vref is set to be lower than a detection voltage detected by current detection resistor 105 when the contacts of thermostat 102 become short-circuited; the detection voltage corresponds to the current flowing through the primary coil in transformer 100.

FIG. 2 shows a configuration in which resistor R is provided between the secondary coil in transformer 100 and thermostat 102. Resistor R limits the current flowing through the secondary coil in transformer 100 when the contacts of thermostat 102 become short-circuited. Resistor R may be omitted if the contacts of thermostat 102 and the secondary coil in transformer 100 are prevented from being degraded or damaged by the current flowing through the secondary coil in transformer 100 when the contacts of thermostat 102 become short-circuited.

In this configuration, when the temperature of heating element 101 is sufficiently low, the contacts of thermostat 102 come into open-circuit condition as described above. Thus, no current flows through the secondary coil in transformer 100. In this case, almost no current flows through the primary coil in transformer 100. Consequently, no AC voltage is generated between the terminals of current detection resistor 105. As a result, comparison circuit 106 outputs a signal indicating that the temperature of heating element 101 is low.

On the other hand, when the temperature of heating element 101 rises and reaches the sensed temperature of thermostat 102, the contacts of thermostat 102 become short-circuited. Then, a current, determined by the impedance of resistor R, the impedance of contacts of thermostat 102 and the impedance of transformer 100, flows through the secondary coil in transformer 100. In this case, a current corresponding to power consumed by the secondary side of transformer 100 also flows through the primary coil in transformer 100. This increases the AC voltage generated between the terminals of current detection resistor 105.

Thus, the voltage rectified by rectifying diode D1 and capacitor C1 included in comparison circuit 106 becomes higher than reference voltage Vref output by reference voltage source Er. Consequently, comparator CMP outputs an alarm signal indicating that the temperature of heating element 101 is high.

The example of the temperature detection apparatus shown in FIG. 2 uses thermostat 102 whose contacts enter into an open-circuit condition when the temperature of heating element 101 is lower than a predetermined value and become short-circuited when the temperature of heating element 101 becomes equal to or higher than the predetermined value. Alternatively, thermostat 102 may be configured such that the contacts become short-circuited when the temperature of heating element 101 is lower than a predetermined value and come into an open-circuit condition when the temperature of heating element 101 becomes equal to or higher than the predetermined value. In this case, during normal operation when the temperature of heating element 101 is lower than the predetermined value, a large current flows through the secondary coil in transformer 100. Thus, as shown in FIG. 2, resistor R is desirably provided between the secondary coil in transformer 100 and thermostat 102. Furthermore, when thermostat 102 has contacts that become short-circuited when the temperature of heating element 101 is lower than the predetermined value, a current flows through the secondary coil in transformer 100 during normal operation. This increases the power consumption of equipment including the temperature detection apparatus according to the present invention. Thus, thermostat 102 is desirably configured such that contacts of thermostat 102 come into an open-circuit condition when the temperature of heating element 101 is lower than a predetermined value and become short-circuited when the temperature of heating element 101 becomes equal to or higher than the predetermined value.

In the temperature detection apparatus according to the first exemplary embodiment, transformer 100 insulates thermostat 102 connected to the secondary coil from transistor 104 and comparison circuit 106 connected to the primary coil. Thus, thermostat 102 can be attached directly to heating element 101, to which a high voltage is applied. This reduces the time lag in the detection of the temperature of heating element 101 and the error in temperature detection caused by extra heat resistance resulting from the interposition of an insulator between heating element 101 and thermostat 102.

Furthermore, the temperature detection apparatus according to the first exemplary embodiment can be composed of general-purpose components. Thus, the temperature detection apparatus is inexpensive and can be miniaturized. The temperature detection apparatus requires no special components and is thus not affected by the unavailability of the components or the like. Therefore, the thermostat can be attached directly to heating element 101 and can be easily configured to detect the temperature of heating element 101.

Second Exemplary Embodiment

Figure 3:
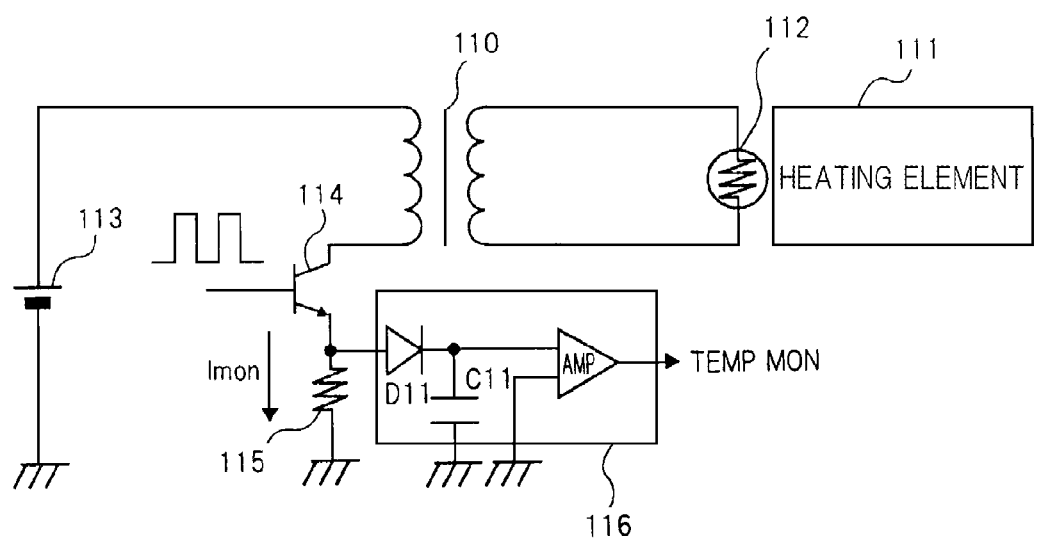
FIG. 3 is a circuit diagram showing an example of the configuration of a temperature detection apparatus according to a second exemplary embodiment.

FIG. 3 is a circuit diagram showing an example of the configuration of a temperature detection apparatus according to a second exemplary embodiment.

As shown in FIG. 3, the temperature detection apparatus according to the second exemplary embodiment includes transformer 110, thermistor 112 connected to a secondary coil in transformer 110 to detect the temperature of heating element 111, DC voltage source 113 and transistor 114 configured to supply required AC power to a primary coil in transformer 110, current detection resistor 115 configured to detect a current flowing through the primary coil in transformer 110, and current detection circuit 116 for detecting a voltage generated across current detection resistor 115 when a current flows through current detection resistor 115, and for outputting a voltage proportional to the voltage.

A pulse signal of a constant frequency generated by an oscillation source (not shown in the drawings) is supplied to transistor 114. Transistor 114 is turned on and off in response to the pulse signal to supply AC power to the primary coil in transformer 110.

Thermistor 112 is attached directly to an electrically conductive site of heating element 111. Thermistor 112 has a resistance value that increases and that decreases according to the temperature of heating element 111.

Current detection resistor 115 is interposed between an emitter of transistor 114 and a ground potential to generate, between the two terminals, a voltage proportional to the current (Imon) flowing through the primary coil in transformer 110.

Current detection circuit 116 includes rectifying diode D11, capacitor C11, and amplification circuit AMP. Rectifying diode D11 and capacitor C11 rectify an AC voltage generated between terminals of current detection resistor 115. Amplification circuit AMP amplifies the rectified DC voltage as required. Current detection circuit 116 then outputs amplified DC voltage (TEMP MON).

In this configuration, a current determined by the impedance of thermistor 112 and secondary coil in transformer 110 flows through the secondary coil in transformer 110. The current flowing through the secondary coil in transformer 110 varies depending on the resistance value of thermistor 112 because the resistance value of thermistor 112 depends on the temperature of heating element 111. In this case, a current corresponding to a variation in the resistance value of thermistor 112 also flows through the primary coil in transformer 110. Thus, the AC voltage generated between the terminals of current detection resistor 115 varies depending on the variation in the resistance value of thermistor 112.

Consequently, amplification circuit AMP amplifies, as required, the voltage rectified by rectifying diode D11 and capacitor C11 included in current detection circuit 116. Current detection circuit 116 then outputs a DC voltage corresponding to the temperature of heating element 111. Thus, the temperature of heating element 111 can be detected by measuring the value of the output voltage from current detection circuit 116.

Like the temperature detection apparatus according to the first exemplary embodiment, the temperature detection apparatus according to the second exemplary embodiment enables the thermistor to be attached directly to heating element 111. Furthermore, the temperature detection apparatus according to the second exemplary embodiment can be easily configured to detect the temperature of heating element 111. Moreover, the temperature detection apparatus according to the second exemplary embodiment allows the temperature of heating element 111 to be measured.

Third Exemplary Embodiment

Figure 4:
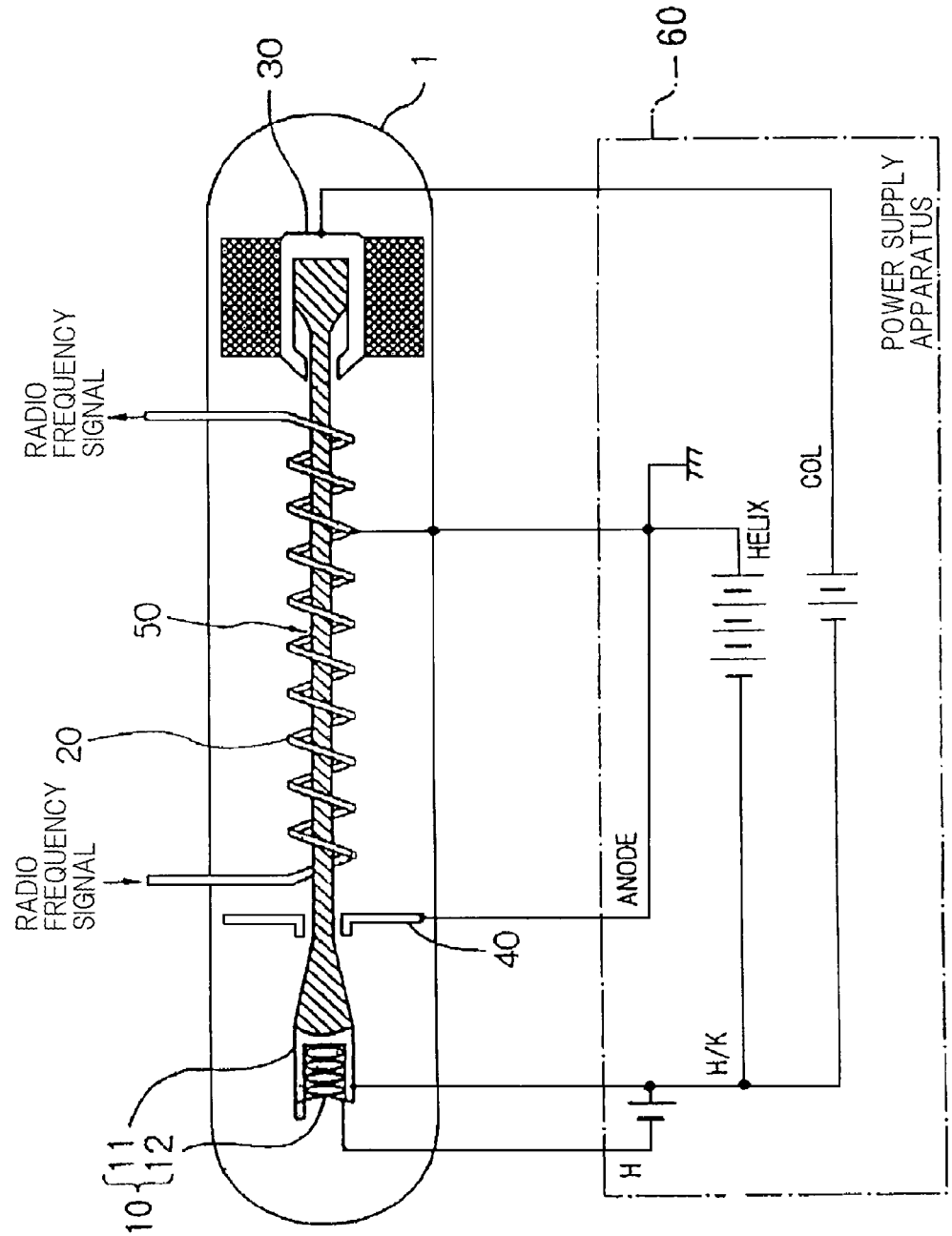
FIG. 4 is a block diagram showing an example of the configuration of a high-frequency circuit system according to the present invention.

FIG. 4 is a block diagram showing an example of the configuration of a high-frequency circuit system according to the present invention.

The high-frequency circuit system shown in FIG. 4 has traveling wave tube 1 and power supply apparatus 60 supplying a required power supply voltage to each electrode of traveling wave tube 1.

For example, as shown in FIG. 4, traveling wave tube 1 includes electron gun 10 emitting electron beam 50, helix electrode 20 that is a high-frequency circuit allowing electron beam 50 emitted by electron gun 10 to interact with a radio frequency signal (microwave), collector electrode 30 capturing electron beam 50 output by helix electrode 20, and anode 40 drawing electrons from electron gun 10 and guiding electron beam 50 emitted from electron gun 10 into spiral helix electrode 20.

Electron gun 10 includes cathode 11 emitting thermal electrons and heater 12 applying heat energy to cathode 11 to allow cathode 11 to emit thermal electrons.

Electron beam 50 emitted by electron gun 10 is accelerated by the potential difference between cathode 11 and helix electrode 20 and guided into helix electrode 20. Electron beam 50 travels through the inside of helix electrode 20, while interacting with the radio frequency signal input from one end of helix electrode 20. Electron beam 50 having passed through the inside of helix electrode 20 is captured by collector electrode 30. At this time, the radio frequency signal amplified through interaction with electron beam 50 is output from the other end of helix electrode 20.

Power supply apparatus 60 supplies cathode 11 with helix voltage (H/K) that is a negative DC voltage based on potential (HELIX) of helix electrode 20. Power supply apparatus 60 supplies collector electrode 30 with collector voltage (COL) that is a positive DC voltage based on potential (H/K) of cathode 11. Furthermore, power supply apparatus 60 supplies heater 12 with heater voltage (H) that is a negative DC voltage based on potential (H/K) of cathode 11. Helix electrode 20 is normally connected to a case of traveling wave tube 1 for grounding.

FIG. 4 shows an example of the configuration of traveling wave tube 1 including collector electrode 30. However, traveling wave tube 1 may include plurality of collector electrodes 30.

Furthermore, the high-frequency circuit system shown in FIG. 4 is configured such that anode 40 and helix electrode 20 are connected together in power supply apparatus 60 to supply a ground potential to anode 40. However, anode 40 may separately be supplied with a voltage of a potential different from that of helix electrode 20. In this case, anode 40 is supplied with anode voltage (ANODE) that is a positive DC current based on the potential (H/K) of cathode 11.

Helix voltage (H/K), collector voltage (COL), and heater voltage (H) are generated using, for example, the transformer, an inverter connected to the primary coil in the transformer to convert an externally supplied DC voltage into an AC voltage, and a rectification circuit converting an AC voltage output from the secondary coil in the transformer into a DC voltage.

In the present exemplary embodiment, the temperature of, for example, collector electrode 30 of traveling wave tube 1 shown in FIG. 4 is measured using the temperature detection apparatus according to the first exemplary embodiment shown in FIG. 2 or the temperature detection apparatus according to the second exemplary embodiment shown in FIG. 3. The temperature measurement target is not limited to the collector electrode but may be another electrode.

Here, the temperature detection apparatus shown in FIG. 2 or FIG. 3 may be built into traveling wave tube 1. Another possible configuration is such that only the thermostat shown in FIG. 2 or the thermistor shown in FIG. 3 is built into traveling wave tube 1, whereas the other components, that is, the transformer, the transistor, the current detection resistor, the comparison circuit (FIG. 2), and the current detection circuit (FIG. 3) are built into power supply apparatus 60.

The third exemplary embodiment may be easily configured to detect the temperature abnormality or the temperature of any electrode of traveling wave tube 1 using the temperature detection apparatus shown in the first exemplary embodiment or the second exemplary embodiment.

While the invention has been particularly shown and described with reference to exemplary embodiments thereof, the invention is not limited to these embodiments. It will be understood by those ordinarily skilled in the art that various changes in form and details may be made therein without departing from the spirit and scope of the present invention as defined by the claims.

The invention claimed is:

1. A temperature detection apparatus configured to detect temperature of a heating element to which a high voltage is applied, said apparatus comprising:
   a transformer;
   a thermostat attached directly to an electrically conductive site of said heating element and having contacts that become short-circuited or come into an open-circuit condition depending on whether or not the temperature of said heating element is equal to or higher than a predetermined value, whose contacts are connected to a secondary coil in said transformer;
   a DC voltage source and a transistor configured to supply required AC power to a primary coil in said transformer;
   a current detection resistor configured to detect a current flowing through the primary coil in said transformer; and
   a comparison circuit detecting a voltage generated across said current detection resistor when a current flows through said current detection resistor, said comparison circuit outputting an alarm signal when the current flowing through the primary coil in said transformer exceeds a preset threshold current.

2. The temperature detection apparatus according to claim 1, wherein the contacts of said thermostat come into an open-circuit condition when the temperature of said heating element is lower than the predetermined value and become short-circuited when the temperature of said heating element is equal to or higher than said predetermined value.

3. A traveling wave tube comprising the temperature detection apparatus according to claim 1,
   wherein said thermostat is attached to a predetermined electrode.

4. A high-frequency circuit system comprising:
   the traveling wave tube according to claim 3; and
   a power supply apparatus supplying a required voltage to each electrode of said traveling wave tube.

* * * * *